United States Patent
Hasegawa

(10) Patent No.: US 12,356,307 B2
(45) Date of Patent: Jul. 8, 2025

(54) WIRELESS COMMUNICATION DEVICE AND WIRELESS COMMUNICATION SYSTEM

(71) Applicant: Fujitsu Limited, Kawasaki (JP)

(72) Inventor: Tetsuya Hasegawa, Setagaya (JP)

(73) Assignee: Fujitsu Limited, Kawasaki (JP)

( * ) Notice: Subject to any disclaimer, the term of this patent is extended or adjusted under 35 U.S.C. 154(b) by 403 days.

(21) Appl. No.: 17/941,130

(22) Filed: Sep. 9, 2022

(65) Prior Publication Data

US 2023/0007562 A1 Jan. 5, 2023

Related U.S. Application Data

(63) Continuation of application No. PCT/JP2020/017865, filed on Apr. 24, 2020.

(51) Int. Cl.
  H04L 12/18 (2006.01)
  H04W 40/02 (2009.01)

(52) U.S. Cl.
  CPC ............. *H04W 40/02* (2013.01); *H04L 12/18* (2013.01)

(58) Field of Classification Search
  CPC ............................. H04W 40/02; H04W 72/12
  USPC ........................................................ 370/329
  See application file for complete search history.

(56) References Cited

U.S. PATENT DOCUMENTS

| | | | |
|---|---|---|---|
| 2012/0008491 A1* | 1/2012 | Shimada | H04L 45/18 370/246 |
| 2017/0214654 A1* | 7/2017 | Johnsen | H04L 49/00 |
| 2021/0058985 A1 | 2/2021 | Fujishiro | |
| 2021/0127296 A1* | 4/2021 | Akl | H04W 28/06 |
| 2021/0160735 A1 | 5/2021 | Fujishiro et al. | |

FOREIGN PATENT DOCUMENTS

| | | |
|---|---|---|
| WO | 2016/132429 A1 | 8/2016 |
| WO | 2019/216371 A1 | 11/2019 |
| WO | 2020/032127 A1 | 2/2020 |

OTHER PUBLICATIONS

International Search Report and Written Opinion issued by the Japan Patent Office for corresponding International Patent Application No. PCT/JP2020/017865, mailed on Aug. 25, 2020, with an English translation.
3GPP TS 36.211 V16.0.0, 3rd Generation Partnership Project; Technical Specification Group Radio Access Network; Evolved Universal Terrestrial Radio Access (E-UTRA); Physical channels and modulation (Release 16), Dec. 2019.
3GPP TS 36.212 V16.0.0, 3rd Generation Partnership Project; Technical Specification Group Radio Access Network; Evolved Universal Terrestrial Radio Access (E-UTRA); Multiplexing and channel coding (Release 16), Dec. 2019.
(Continued)

*Primary Examiner* — Angel T Brockman
(74) *Attorney, Agent, or Firm* — Myers Wolin, LLC

(57) ABSTRACT

A wireless communication device includes a processor that generates a packet and a transmitter that wirelessly transmits the packet generated by the processor. The processor is configured to generate a packet containing data destined for a plurality of nodes and set a destination address different from respective addresses of the plurality of nodes in the generated packet, the destination address specifying that the packet is destined for the plurality of nodes.

10 Claims, 10 Drawing Sheets

(56) References Cited

OTHER PUBLICATIONS

3GPP TS 36.213 V16.0.0, 3rd Generation Partnership Project; Technical Specification Group Radio Access Network; Evolved Universal Terrestrial Radio Access (E-UTRA); Physical layer procedures (Release 16), Dec. 2019.
3GPP TS 36.300 V16.0.0, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description;Stage 2 (Release 16), Dec. 2019.
3GPP TS 36.321 V15.8.0, 3rd Generation Partnership Project; Technical Specification Group Radio Access Network; Evolved Universal Terrestrial Radio Access (E-UTRA); Medium Access Control (MAC) protocol specification (Release 15), Dec. 2019.
3GPP TS 36.322 V15.3.0, 3rd Generation Partnership Project; Technical Specification Group Radio Access Network; Evolved Universal Terrestrial Radio Access (E-UTRA); Radio Link Control (RLC) protocol specification (Release 15), Sep. 2019.
3GPP TS 36.323 V15.5.0, 3rd Generation Partnership Project; Technical Specification Group Radio Access Network; Evolved Universal Terrestrial Radio Access (E-UTRA); Packet Data Convergence Protocol (PDCP) specification (Release 15), Dec. 2019.
3GPP TS 36.331 V15.8.0, 3rd Generation Partnership Project; Technical Specification Group Radio Access Network; Evolved Universal Terrestrial Radio Access (E-UTRA); Radio Resource Control (RRC); Protocol specification (Release 15), Dec. 2019.
3GPP TS 36.413 V16.0.0, 3rd Generation Partnership Project; Technical Specification Group Radio Access Network; Evolved Universal Terrestrial Radio Access Network (E-UTRAN); S1 Application Protocol (S1AP) (Release 16), Dec. 2019.
3GPP TS 36.423 V16.0.0, 3rd Generation Partnership Project; Technical Specification Group Radio Access Network; Evolved Universal Terrestrial Radio Access Network (E-UTRAN); X2 application protocol (X2AP) (Release 16), Dec. 2019.
3GPP TS 36.425 V15.0.0, 3rd Generation Partnership Project; Technical Specification Group Radio Access Network; Evolved Universal Terrestrial Radio Access Network (E-UTRAN); X2 interface user plane protocol (Release 15), Jun. 2018.
3GPP TS 37.340 V16.0.0, 3rd Generation Partnership Project; Technical Specification Group Radio Access Network; Evolved Universal Terrestrial Radio Access (E-UTRA) and NR; Multi-connectivity; Stage 2 (Release 16), Dec. 2019.
3GPP TS 38.201 V16.0.0, 3rd Generation Partnership Project; Technical Specification Group Radio Access Network; NR; Physical layer; General description (Release 16), Dec. 2019.
3GPP TS 38.202 V16.0.0, 3rd Generation Partnership Project; Technical Specification Group Radio Access Network; NR; Services provided by the physical layer (Release 16), Dec. 2019.
3GPP TS 38.211 V16.0.0, 3rd Generation Partnership Project; Technical Specification Group Radio Access Network; NR; Physical channels and modulation (Release 16), Dec. 2019.
3GPP TS 38.212 V16.0.0, 3rd Generation Partnership Project; Technical Specification Group Radio Access Network; NR; Multiplexing and channel coding (Release 16), Dec. 2019.
3GPP TS 38.213 V16.0.0, 3rd Generation Partnership Project; Technical Specification Group Radio Access Network; NR; Physical layer procedures for control (Release 16), Dec. 2019.
3GPP TS 38.214 V16.0.0, 3rd Generation Partnership Project; Technical Specification Group Radio Access Network; NR; Physical layer procedures for data (Release 16), Dec. 2019.
3GPP TS 38.215 V16.0.1, 3rd Generation Partnership Project; Technical Specification Group Radio Access Network; NR; Physical layer measurements (Release 16), Jan. 2020.
3GPP TS 38.300 V16.0.0, 3rd Generation Partnership Project; Technical Specification Group Radio Access Network; NR; NR and NG-RAN Overall Description; Stage 2 (Release 16), Dec. 2019.
3GPP TS 38.321 V15.8.0, 3rd Generation Partnership Project; Technical Specification Group Radio Access Network; NR; Medium Access Control (MAC) protocol specification (Release 15), Dec. 2019.
3GPP TS 38.322 V15.5.0, 3rd Generation Partnership Project; Technical Specification Group Radio Access Network; NR; Radio Link Control (RLC) protocol specification (Release 15), Mar. 2019.
3GPP TS 38.323 V15.6.0, 3rd Generation Partnership Project; Technical Specification Group Radio Access Network; NR; Packet Data Convergence Protocol (PDCP) specification (Release 15), Jun. 2019.
3GPP TS 38.331 V15.8.0, 3rd Generation Partnership Project; Technical Specification Group Radio Access Network; NR; Radio Resource Control (RRC) protocol specification (Release 15), Dec. 2019.
3GPP TS 38.401 V16.0.0, 3rd Generation Partnership Project; Technical Specification Group Radio Access Network; NG-RAN; Architecture description (Release 16), Dec. 2019.
3GPP TS 38.410 V16.0.0, 3rd Generation Partnership Project; Technical Specification Group Radio Access Network; NG-RAN; NG general aspects and principles (Release 16), Dec. 2019.
3GPP TS 38.413 V16.0.0, 3rd Generation Partnership Project; Technical Specification Group Radio Access Network; NG-RAN; NG Application Protocol (NGAP) (Release 16), Dec. 2019.
3GPP TS 38.420 V15.2.0, 3rd Generation Partnership Project; Technical Specification Group Radio Access Network; NG-RAN; Xn general aspects and principles (Release 15) Dec. 2018.
3GPP TS 38.423 V16.0.0, 3rd Generation Partnership Project; Technical Specification Group Radio Access Network; NG-RAN; Xn application protocol (XnAP) (Release 16), Dec. 2019.
3GPP TS 38.470 V16.0.0, 3rd Generation Partnership Project; Technical Specification Group Radio Access Network; NG-RAN F1 general aspects and principles (Release 16), Dec. 2019.
3GPP TS 38.473 V16.0.0, 3rd Generation Partnership Project; Technical Specification Group Radio Access Network; NG-RAN; F1 application protocol (F1AP) (Release 16), Dec. 2019.
3GPP TR 38.801 V14.0.0, 3rd Generation Partnership Project; Technical Specification Group Radio Access Network; Study on new radio access technology: Radio access architecture and interfaces (Release 14) Mar. 2017.
3GPP TR 38.802 V14.2.0, 3rd Generation Partnership Project; Technical Specification Group Radio Access Network; Study on New Radio Access Technology Physical Layer Aspects (Release 14) Sep. 2017.
3GPP TR 38.803 V14.2.0, 3rd Generation Partnership Project; Technical Specification Group Radio Access Network; Study on new radio access technology: Radio Frequency (RF) and co-existence aspects (Release 14), Sep. 2017.
3GPP TR 38.804 V14.0.0, 3rd Generation Partnership Project; Technical Specification Group Radio Access Network; Study on New Radio Access Technology; Radio Interface Protocol Aspects (Release 14), Mar. 2017.
3GPP TR 38.900 V15.0.0, 3rd Generation Partnership Project; Technical Specification Group Radio Access Network; Study on channel model for frequency spectrum above 6 GHZ (Release 15) Jun. 2018.
3GPP TR 38.912 V15.0.0, 3rd Generation Partnership Project; Technical Specification Group Radio Access Network; Study on New Radio (NR) access technology (Release 15), Jun. 2018.
3GPP TR 38.913 V15.0.0, 3rd Generation Partnership Project; Technical Specification Group Radio Access Network; Study on Scenarios and Requirements for Next Generation Access Technologies; (Release 15), Jun. 2018.
3GPP TS 38.340 V1.0.0, 3rd Generation Partnership Project; Technical Specification Group Radio Access Network; NR; Backhaul Adaptation Protocol (BAP) specification (Release 16), Mar. 2020.
Notice of Reasons for Refusal issued by the Japan Patent Office for corresponding Japanese Patent Application No. 2022-516825, mailed on Nov. 14, 2023, with an English translation.

\* cited by examiner

| D/C | R | R | R | DESTINATION ADDRESS | |
|---|---|---|---|---|---|
| DESTINATION ADDRESS | | | | | PATH |
| PATH | | | | | |
| DATA | | | | | |

WIRELESS COMMUNICATION DEVICE AND WIRELESS COMMUNICATION SYSTEM

CROSS-REFERENCE TO RELATED APPLICATION

This application is a continuation application of International Application No. PCT/JP2020/017865, filed on Apr. 24, 2020 and designating the U.S., the entire contents of which are incorporated herein by reference.

FIELD

The embodiments discussed herein are related to a wireless communication device and a wireless communication system.

BACKGROUND

In current networks, the traffic by mobile terminals (smartphones and feature phones) accounts for the majority of network resources. In addition, the traffic used by mobile terminals tends to increase in the future.

Meanwhile, in line with the development of Internet of Things (IoT) services (traffic systems, smart meters, and monitoring systems of devices or the like, for example), responding to services having various requirements is demanded. Thus, the communication standards of 5th Generation Mobile Communication (5G or New Radio (NR)) require technologies achieving even higher data signal rate, larger capacity, and lower latency in addition to the standard technologies of 4th Generation Mobile Communication (4G) (3GPP TS 36.211 V16.0.0 (2019-12), 3GPP TS 36.212 V16.0.0 (2019-12), 3GPP TS 36.213 V16.0.0 (2019-12), 3GPP TS 36.300 V16.0.0 (2019-12), 3GPP TS 36.321 V15.8.0 (2019-12), 3GPP TS 36.322 V15.3.0 (2019-09), 3GPP TS 36.323 V15.5.0 (2019-12), 3GPP TS 36.331 V15.8.0 (2019-12), 3GPP TS 36.413 V16.0.0 (2019-12), 3GPP TS 36.423 V16.0.0 (2019-12), and 3GPP TS 36.425 V15.0.0 (2018-06), for example). The 5th generation communication standards are being technically studied in the working groups of 3rd Generation Partnership Project (3GPP) (TSG-RAN WG1 and TSG-RAN WG2, for example), and the first edition was issued in December of 2017 (3GPP TS 37.340 V16.0.0 (2019-12), 3GPP TS 38.201 V16.0.0 (2019-12), 3GPP TS 38.202 V16.0.0 (2019-12), 3GPP TS 38.211 V16.0.0 (2019-12), 3GPP TS 38.212 V16.0.0 (2019-12), 3GPP TS 38.213 V16.0.0 (2019-12), 3GPP TS 38.214 V16.0.0 (2019-12), 3GPP TS 38.215 V16.0.1 (2020-01), 3GPP TS 38.300 V16.0.0 (2019-12), 3GPP TS 38.321 V15.8.0 (2019-12), 3GPP TS 38.322 V15.5.0 (2019-03), 3GPP TS 38.323 V15.6.0 (2019-06), 3GPP TS 38.331 V15.8.0 (2019-12), 3GPP TS 38.340 V1.0.0 (2020-03), 3GPP TS 38.401 V16.0.0 (2019-12), 3GPP TS 38.410 V16.0.0 (2019-12), 3GPP TS 38.413 V16.0.0 (2019-12), 3GPP TS 38.420 V15.2.0 (2018-12), 3GPP TS 38.423 V16.0.0 (2019-12), 3GPP TS 38.470 V16.0.0 (2019-12), 3GPP TS 38.473 V16.0.0 (2019-12), 3GPP TR 38.801 V14.0.0 (2017-03), 3GPP TR 38.802 V14.2.0 (2017-09), 3GPP TR 38.803 V14.2.0 (2017-09), 3GPP TR 38.804 V14.0.0 (2017-03), 3GPP TR 38.900 V15.0.0 (2018-06), 3GPP TR 38.912 V15.0.0 (2018-06), and 3GPP TR 38.913 V15.0.0 (2018-06)).

As described above, to respond to various services, 5G assumes supporting many use cases classified into Enhanced Mobile BroadBand (eMBB), Massive Machine Type Communications (MTC), and Ultra-Reliable and Low Latency Communication (URLLC).

In 5G, relaying communications between a base station device and pieces of user equipment by another base station device is being studied. In this relaying, a plurality of base station devices located between a core network and the pieces of user equipment are connected wirelessly, and relaying is executed by wireless communication between the base station devices. Such relaying in 5G, which is also called Integrated Access and Backhaul (IAB), allows multi-hop relaying. In IAB, the uppermost IAB donor connected to the core network and IAB nodes are wirelessly connected to each other, and the IAB donor can communicate with the pieces of user equipment via one or more IAB nodes (3GPP TS 38.340 V1.0.0 (2020-03)). In this process, the IAB donor transmits a path setting packet to each IAB node on the path to the user terminal and, with a packet transfer path set, transmits a packet containing data (the related technologies are described, for example, in International Publication Pamphlet No. WO 2019/216371).

However, in IAB networks, there is a problem in that the number of packets transmitted and received between the IAB donor and the IAB nodes tends to increase, causing congestion. Specifically, when paging information such as an emergency bulletin or System Information Block (SIB) is broadcast, for example, the path setting packet is transmitted from the IAB donor to all the subordinate IAB nodes, and then a packet containing paging information or SIB is transmitted to each IAB node. In this process, even if a path to any IAB node partially overlaps with a path to another IAB node, the packet is transmitted separately to each IAB node.

That is to say, when two IAB nodes are connected in series to the IAB donor, for example, the IAB donor transmits the path setting packet to the upper IAB node and also transmits the path setting packet to the lower IAB node via the upper IAB node. Subsequently, the IAB donor transmits the packet containing data to the upper IAB node and transmits a similar packet to the lower IAB node via the upper IAB node.

Thus, the IAB donor transmits the packet to be broadcast or multicast individually to each IAB node in the same manner as in unicast. Given this situation, the number of packets transmitted in IAB networks increases, and congestion in radio channels may occur. As a result, throughput is lowered in IAB networks.

SUMMARY

According to an aspect of an embodiment, a wireless communication device includes a processor that generates a packet and a transmitter that wirelessly transmits the packet generated by the processor. The processor is configured to generate a packet containing data destined for a plurality of nodes and set a destination address different from respective addresses of the plurality of nodes in the generated packet, the destination address specifying that the packet is destined for the plurality of nodes.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Preferred embodiments will be explained with reference to accompanying drawings. These embodiments do not limit the present invention.

[a] First Embodiment

Figure 1:
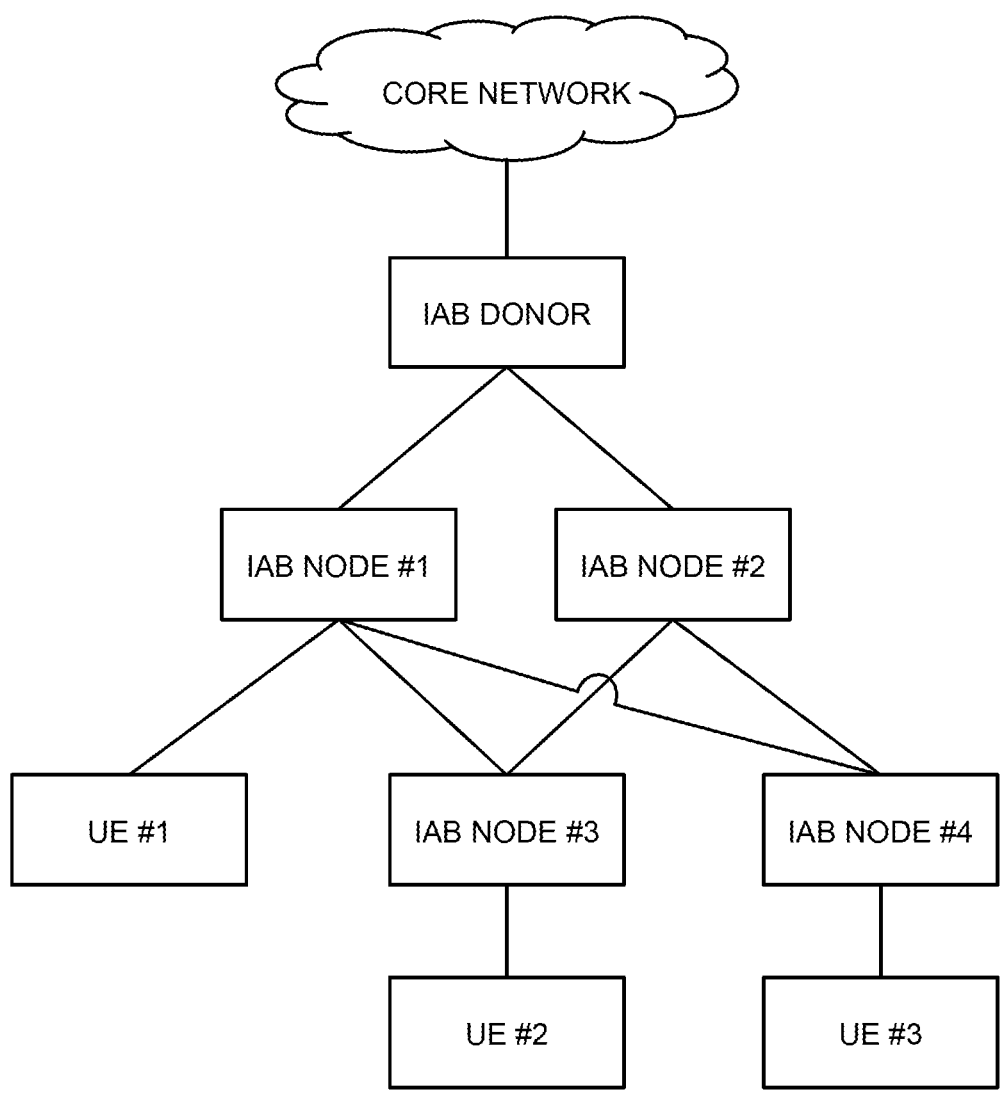
FIG. 1 is a diagram of a configuration example of a wireless communication system according to a first embodiment.

FIG. 1 is a diagram of a configuration example of a wireless communication system according to a first embodiment.

The wireless communication system illustrated in FIG. 1 includes an IAB donor connected to a core network, a plurality of IAB nodes #1 to #4, and UEs #1 to #3 that are user equipment. In the following, it is assumed that a device closer to the core network is an upper device, whereas a device farther from the core network is a lower device. Thus, in the wireless communication system illustrated in FIG. 1, the IAB donor is the uppermost device, the IAB nodes #1 and #2 are connected to the lower position of the IAB donor, and the IAB nodes #3 and #4 are connected to the lower position of the IAB nodes #1 and #2. For wireless communication between the IAB donor and the IAB nodes #1 to #4, Backhaul Adaptation Protocol (BAP) is used, for example.

The IAB donor is connected to the core network in a wired manner and is a wireless communication device wirelessly communicating with the IAB nodes. The IAB donor transmits a packet received from the core network to the UEs #1 to #3 via the IAB nodes #1 to #4. The IAB donor transmits packets received from the UEs #1 to #3 via the IAB nodes #1 to #4 to the core network. The IAB donor is connected in a wired manner to Access and Mobility Management Function (AMF) and User Plane Function (UPF), for example, forming the core network.

When transmitting a packet to the UEs #1 to #3, the IAB donor transmits a path setting packet to the IAB nodes #1 to #4 on paths and then transmits the packet containing data. In this process, the IAB donor sets a destination address for each packet and wirelessly transmits the packet. In setting the destination address, the IAB donor sets an address for broadcast for a broadcast packet containing data to be broadcast and sets an address for multicast for a multicast packet containing data to be multicast. That is to say, the IAB donor sets, for a packet to be transmitted to a plurality of destinations, an address specifying that it is a packet to be transmitted to the destinations, rather than the address of each of the IAB nodes #1 to #4 or the UEs #1 to #3. The configuration of the IAB donor will be discussed later in detail.

The IAB nodes #1 to #4 are wireless communication devices wirelessly communicating with the IAB donor or the other IAB nodes #1 to #4. The IAB nodes #1 to #4 receive a packet from the upper IAB donor or IAB node and transfer the packet in accordance with the destination address of the received packet. That is to say, the IAB nodes #1 to #4, if the destination address of the received packet is their own address, execute termination processing on the received packet and wirelessly transmit the packet to the UEs #1 to #3, which are connected subordinate thereto. The IAB nodes #1 to #4, if the destination address of the received packet is the address for broadcast, execute termination processing on the received packet, wirelessly transmit the packet to the UEs #1 to #3, which are subordinate thereto, and transfer the packet to all the IAB nodes connected to the lower position thereof. Furthermore, the IAB nodes #1 to #4, if the destination address of the received packet is the address of any of the lower IAB nodes or the address for multicast, transfer the received packet to a transmission destination set in advance by the path setting packet. The configuration of the IAB nodes #1 to #4 will be described later in detail.

The UEs #1 to #3 are pieces of user equipment wirelessly communicating with the IAB nodes #1 to #4. Specifically, the UE #1 is positioned subordinate to the IAB node #1 and transmits and receives a packet to and from the IAB node #1. The UE #2 is positioned subordinate to the IAB node #3 and transmits and receives a packet to and from the IAB node #3. The UE #3 is positioned subordinate to the IAB node #4 and transmits and receives a packet to and from the IAB node #4.

Figure 2:
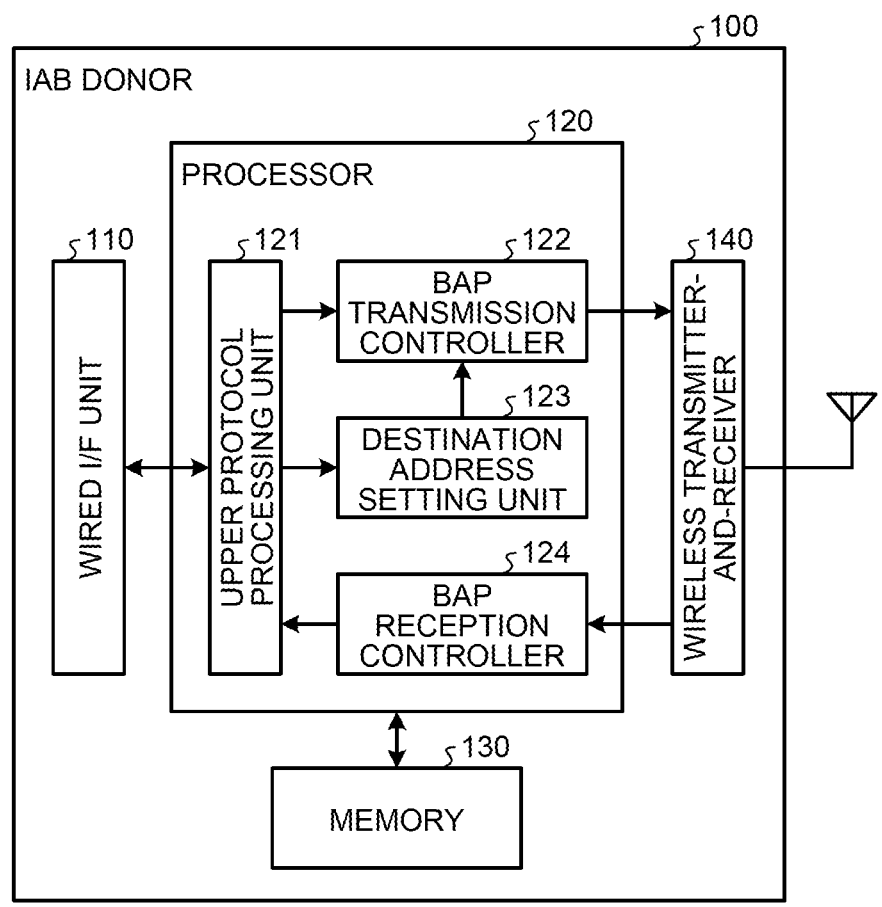
FIG. 2 is a block diagram of a configuration of an IAB donor according to the first embodiment.

FIG. 2 is a block diagram of a configuration of an IAB donor 100, which is equivalent to the IAB donor illustrated in FIG. 1. The IAB donor 100 illustrated in FIG. 2 includes a wired interface unit (hereinafter, abbreviated as a "wired I/F unit") 110, a processor 120, a memory 130, and a wireless transmitter-and-receiver 140.

The wired I/F unit 110 is connected to the core network in a wired manner and transmits and receives data to and from AMF and UPF, for example, forming the core network. The wired I/F unit 110 outputs data received from the core network to the processor 120 and transmits data input from the processor 120 to the core network.

The processor 120 includes a central processing unit (CPU), a field programmable gate array (FPGA), or a digital signal processor (DSP), for example, to collectively control the entire IAB donor 100. Specifically, the processor 120 includes an upper protocol processing unit 121, a BAP transmission controller 122, a destination address setting unit 123, and a BAP reception controller 124.

The upper protocol processing unit 121 executes the processing of a protocol upper than BAP on data. Specifically, the upper protocol processing unit 121 executes the processing of a protocol such as Packet Data Convergence Protocol (PDCP), User Datagram Protocol (UDP), or Internet Protocol (IP). The upper protocol processing unit 121 performs the processing of each protocol on the data input from the wired I/F unit 110 and outputs obtained transmission data to the BAP transmission controller 122. The upper protocol processing unit 121 gives notification of the address of the transmission data to the destination address setting unit 123. The upper protocol processing unit 121 performs the processing of each protocol on reception data input from the BAP reception controller 124 and outputs obtained data to the wired I/F unit 110.

The BAP transmission controller 122 performs BAP processing on the transmission data. Specifically, the BAP transmission controller 122 adds a BAP header to the transmission data to generate a BAP packet. In this process, the BAP transmission controller 122 stores a destination address set by the destination address setting unit 123 in a destination address field of the BAP header.

Figure 3:
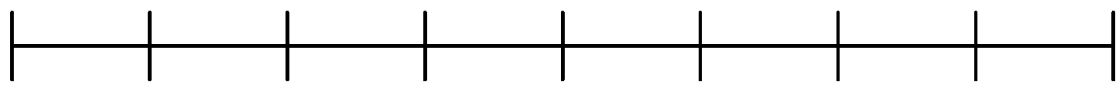
FIG. 3 is a diagram of a specific example of a packet format.

FIG. 3 illustrates an example of a packet format of BAP generated by the BAP transmission controller 122. In FIG. 3, D/C is a field representing a packet type whether it is a packet for data or a packet for control, whereas R is a field representing reserve bit. The destination address field is placed from the top row to the second row, and the BAP transmission controller 122 stores the destination address set by the destination address setting unit 123 in this field. Following the destination address field, a path field is placed. The path field stores therein the identification information of a path in an IAB network. These fields are contained in the BAP header, and thus the BAP transmission controller 122 adds the header containing these fields to the data to generate the BAP packet.

The BAP transmission controller 122, if the destination of the BAP packet is one IAB node or a plurality of specific IAB nodes, generates a path setting packet for setting a packet transfer path. The BAP transmission controller 122 generates the path setting packet providing a transmission destination of a packet received from the upper IAB donor 100 or IAB node for each IAB node positioned on a transfer path to the IAB node as the destination of the packet. That is to say, the BAP transmission controller 122 sets the path setting packet specifying a correspondence relation between the destination address of the packet and the transmission destination of the packet. The BAP transmission controller 122 sets the address of each IAB node on the transfer path as the destination address of the path setting packet.

Upon being given notification of the destination of the transmission data from the upper protocol processing unit 121, the destination address setting unit 123 sets a destination address corresponding to the address the notification of which has been given. Specifically, if the destination of the transmission data is a single IAB node, the destination address setting unit 123 sets the address of this IAB node as the destination address. If the destination of the transmission data is a plurality of specific IAB nodes, the destination address setting unit 123 sets the address for multicast as the destination address. Furthermore, if the destination of the transmission data is all the IAB nodes, the destination address setting unit 123 sets the address for broadcast as the destination address.

The destination address setting unit 123 uses values that are not used as the addresses of the IAB nodes as the address for multicast and the address for broadcast. The destination address setting unit 123 can use an address headed by E in hexadecimal notation (0xE000 0000 or the like) as the address for multicast and use an address headed by F (0xFFFF FFFF or the like) as the address for broadcast, for example.

The BAP reception controller 124 acquires the BAP packet from the wireless transmitter-and-receiver 140, takes the reception data out of the packet, and outputs the reception data to the upper protocol processing unit 121.

The memory 130 includes a random access memory (RAM) or a read only memory (ROM), for example, and stores therein various information when the processor 120 executes the processing.

The wireless transmitter-and-receiver 140 performs wireless transmission processing on the BAP packet and the path setting packet generated by the BAP transmission controller 122 and transmits them via an antenna. The wireless transmitter-and-receiver 140 receives the BAP packet via the antenna, performs wireless reception processing on the received packet, and outputs the packet to the BAP reception controller 124.

Figure 4:
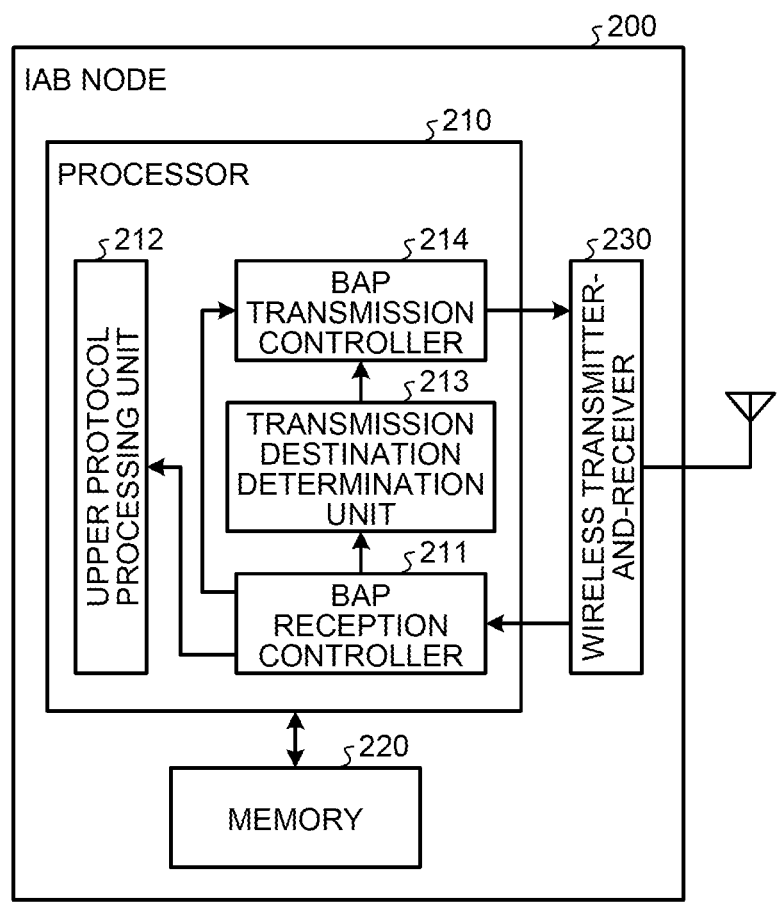
FIG. 4 is a block diagram of a configuration of an IAB node according to the first embodiment.

FIG. 4 is a block diagram of a configuration of an IAB node 200, which is equivalent to the IAB nodes #1 to #4 illustrated in FIG. 1. The IAB node 200 illustrated in FIG. 4 includes a processor 210, a memory 220, and a wireless transmitter-and-receiver 230.

The processor 210 includes a CPU, an FPGA, or a DSP, for example, to collectively control the entire IAB node 200. Specifically, the processor 210 includes a BAP reception controller 211, an upper protocol processing unit 212, a transmission destination determination unit 213, and a BAP transmission controller 214.

The BAP reception controller 211 acquires the BAP packet from the wireless transmitter-and-receiver 230 and, if the destination address contained in the header of the packet is the address of the IAB node 200, executes BAP termination processing. That is to say, the BAP reception controller 211 takes the reception data out of the BAP packet and outputs the reception data to the upper protocol processing unit 212. If the destination address contained in the header of the packet is not the address of the IAB node 200, the BAP reception controller 211 outputs the packet to the BAP transmission controller 214.

If the destination address contained in the header of the packet is the address for broadcast, the BAP reception controller 211 executes the BAP termination processing to output the reception data to the upper protocol processing unit 212 and outputs the BAP packet to the BAP transmission controller 214. Furthermore, if the destination address contained in the header of the packet is the address for multicast, and if the path setting packet with an instruction on the termination processing of the multicast packet has been received in advance, the BAP reception controller 211 executes the BAP termination processing to output the reception data to the upper protocol processing unit 212 and outputs the BAP packet to the BAP transmission controller 214.

The upper protocol processing unit 212 executes the processing of a protocol upper than BAP on data. Specifically, the upper protocol processing unit 212 executes the processing of a protocol such as Radio Link Control (RLC), UDP, or IP. The upper protocol processing unit 212 performs the processing of each protocol on the reception data input from the BAP reception controller 211 and wirelessly transmits obtained data from the wireless transmitter-and-receiver 230, for example, to the user equipment.

The transmission destination determination unit 213 determines the transmission destination of the packet output from the BAP reception controller 211 to the BAP transmission controller 214 based on a correspondence relation between the destination address and the transmission destination specified by the path setting packet. Specifically, the transmission destination determination unit 213 acquires the destination address of the packet output from the BAP reception controller 211 and identifies a transmission destination provided by the path setting packet, the transmission destination corresponding to the acquired destination address.

In this process, if the destination address is the address of the IAB node, the transmission destination determination unit 213 identifies the transmission destination provided by the path setting packet. If the destination address is the address for multicast also, the transmission destination determination unit 213 identifies the transmission destination provided by the path setting packet. If the destination address is the address for broadcast, the transmission destination determination unit 213 identifies all the IAB nodes connected to the lower position of the IAB node 200 as the transmission destination. The transmission destination determination unit 213 gives notification of the identified transmission destination to the BAP transmission controller 214.

The BAP transmission controller 214 transfers the packet output from the BAP reception controller 211 to the transmission destination the notification of which is given from the transmission destination determination unit 213. That is to say, the BAP transmission controller 214 executes transmission processing to transfer the packet the destination address of which is the address of the IAB node or the address for multicast to the transmission destination provided by the path setting packet. The BAP transmission controller 214 also executes transmission processing to transfer the packet the destination address of which is the address for broadcast to all the IAB nodes connected to the lower position of the IAB node 200.

The memory 220 includes a RAM or a ROM, for example, and stores therein various information when the processor 210 executes the processing.

The wireless transmitter-and-receiver 230 receives the BAP packet via an antenna, performs wireless reception processing on the received packet, and outputs the packet to the BAP reception controller 211. The wireless transmitter-and-receiver 230 performs wireless transmission processing on the BAP packet subjected to the transmission processing by the BAP transmission controller 214, and transmits the packet via the antenna.

Figure 5:
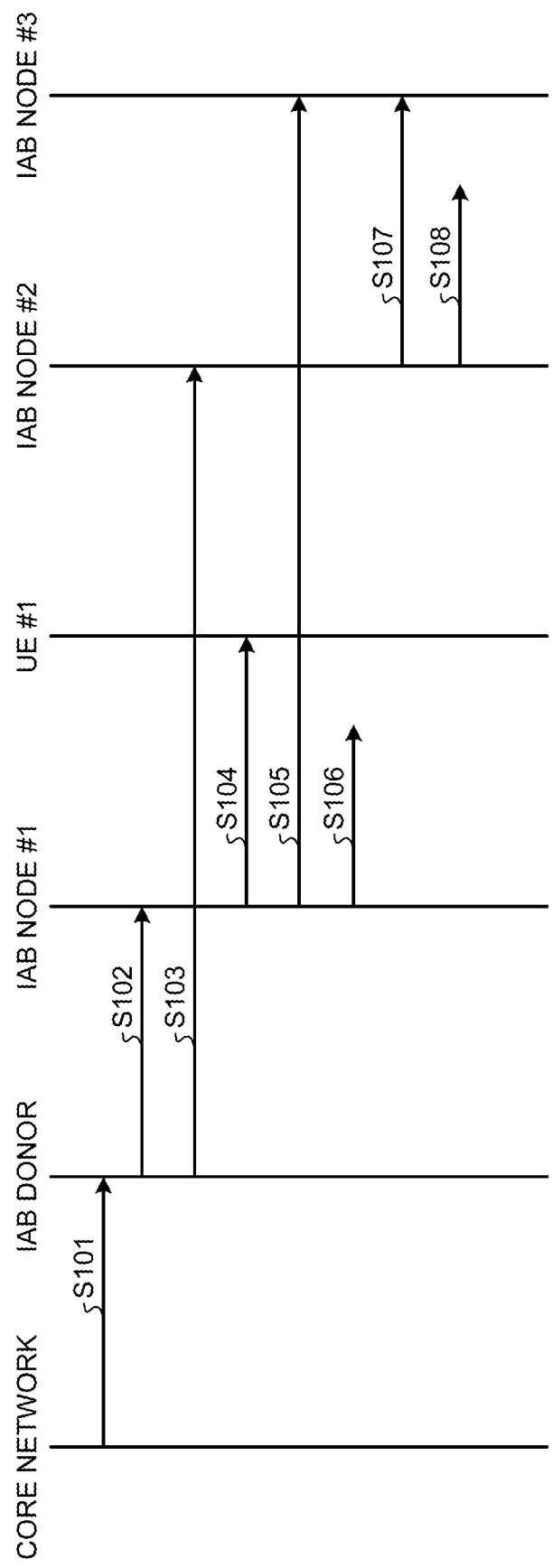
FIG. 5 is a sequence diagram of an example of broadcast according to the first embodiment.

The following describes packet broadcasting in the wireless communication system illustrated in FIG. 1 with reference to the sequence diagram illustrated in FIG. 5.

Data to be broadcast is transmitted from the core network and is received by the IAB donor (Step S101). Examples of the data to be broadcast include paging information such as an emergency bulletin and information on SIB.

The IAB donor generates the BAP packet from the data to be broadcast. That is to say, the BAP transmission controller 122 adds the BAP header to the data to generate the packet. In this process, the destination address setting unit 123 sets the destination address of the packet to the address for broadcast. In other words, an address for broadcast headed by F such as "0xFFFFFF FFFF" is stored in the destination address field of the header.

The BAP packet is transmitted to the IAB nodes #1 and #2, which are connected to the lower position of the IAB donor (Steps S102 and S103). Upon reception of the packet by the IAB node #1, the destination address is the address for broadcast, and thus the BAP reception controller 211 executes the BAP termination processing, so that the data contained in the packet is output to the upper protocol processing unit 212. Then, with the processing of each protocol performed by the upper protocol processing unit 212, the data contained in the packet is wirelessly transmitted to the UE #1, which is subordinate to the IAB node #1 (Step S104).

The destination address of the packet received by the IAB node #1 is the address for broadcast, so that this packet is also output from the BAP reception controller 211 to the BAP transmission controller 214. The destination address is the address for broadcast, and thus the transmission destination of the packet is identified as the IAB nodes #3 and #4, which are connected to the lower position of the IAB node #1, so that the packet is transferred to the IAB nodes #3 and #4 (Steps S105 and S106). Although illustration of the IAB node #4 is omitted in FIG. 5, Step S106 indicates transfer of the packet from the IAB node #1 to the IAB node #4.

Upon reception of the packet transmitted from the IAB node #1 by the IAB nodes #3 and #4, the destination address is the address for broadcast, and thus the BAP termination processing is executed, so that the data contained in the packet is wirelessly transmitted to the UEs #2 and #3, which are subordinate to the IAB nodes #3 and #4, respectively.

On the other hand, upon reception of the packet transmitted from the IAB donor by the IAB node #2, the destination address is the address for broadcast, so that this packet is output from the BAP reception controller 211 to the BAP transmission controller 214. The destination address is the address for broadcast, and thus the transmission destination of the packet is identified as the IAB nodes #3 and #4, which are connected to the lower position of the IAB node #2, so that the packet is transferred to the IAB nodes #3 and #4 (Steps S107 and S108). Although illustration of the IAB node #4 is omitted in FIG. 5, Step S108 indicates transfer of the packet from the IAB node #2 to the IAB node #4.

Upon reception of the packet transmitted from the IAB node #2 by the IAB nodes #3 and #4, the destination address is the address for broadcast, and thus the BAP termination processing is executed, so that the data contained in the packet is wirelessly transmitted to the UEs #2 and #3, which are subordinate to the IAB nodes #3 and #4, respectively.

Thus, by setting the destination address of the packet to the address for broadcast, each IAB node transfers the packet to all the IAB nodes connected to the lower position thereof and also transmits the data contained in the packet to the UE, which is subordinate thereto. Thus, when broadcasting the data, the IAB donor does not need to transmit the path setting packet and only needs to transmit the packet once each to the IAB nodes #1 and #2, which are the immediately lower position thereof, without transmitting the packet individually to each IAB node. Consequently, the number of packets transmitted and received in the IAB network can be reduced, and the occurrence of congestion can be avoided to mitigate a reduction in throughput.

Figure 6:
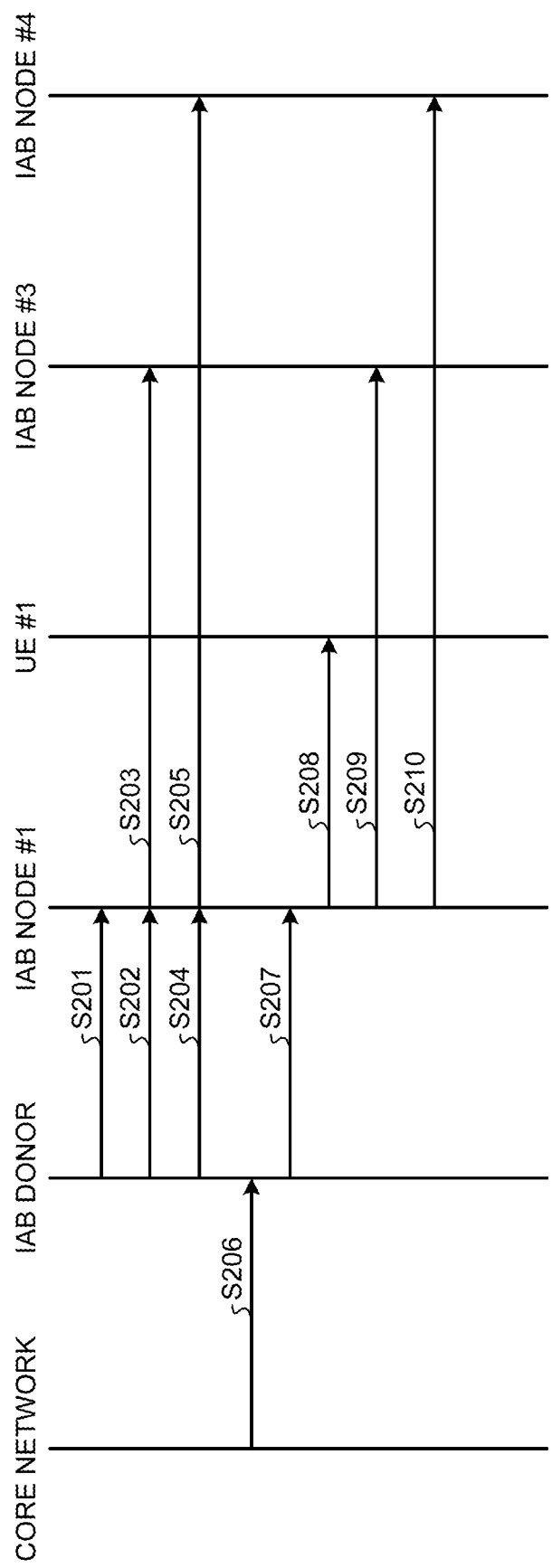
FIG. 6 is a sequence diagram of an example of multicast according to the first embodiment.

The following describes packet multicasting in the wireless communication system illustrated in FIG. 1 with reference to the sequence diagram illustrated in FIG. 6.

When data is multicast, a group of IAB nodes is set, and the IAB nodes belonging to the group receive the packet. The following gives a description with the IAB nodes #1, #3, and #4, except for the IAB node #2, assumed to belong to the group. The IAB donor determines packet transfer paths to the IAB nodes #1, #3, and #4, which belong to the group, and transmits the path setting packet to each of the IAB nodes #1, #3, and #4.

Specifically, the IAB donor transmits, to the IAB node #1, the path setting packet with an instruction to perform termination processing on the packet the destination address of which is the address for multicast and to transfer the packet to the IAB nodes #3 and #4 (Step S201). The IAB donor also transmits, to the IAB node #3 via the IAB node #1, the path setting packet with an instruction to perform termination processing on the packet the destination address of which is the address for multicast (Steps S202 and S203). Similarly, the IAB donor transmits, to the IAB node #4 via the IAB node #1, the pass setting packet with an instruction to perform termination processing on the packet the destination address of which is the address for multicast (Steps S204 and S205).

Thus, the IAB donor transmits, to each IAB node, the path setting packet with an instruction on processing when receiving the packet with the address for multicast. The path setting packet is transmitted to all the IAB nodes positioned on the transfer path from the IAB donor to the IAB nodes belonging to the group. Consequently, the path setting packet may be transmitted to even the IAB node that does not belong to the group so long as it is an IAB node positioned on the transfer path.

By the way, the data to be multicast is transmitted from the core network and is received by the IAB donor (Step S206). Examples of the data to be multicast include information on multimedia distribution such as Multimedia Broadcast and Multicast Service (MBMS).

The IAB donor generates the BAP packet from the data to be multicast. That is to say, the BAP transmission controller 122 adds the BAP header to the data to generate the packet. In this process, the destination address setting unit 123 sets the destination address of the packet to the address for multicast. In other words, an address for multicast headed by E such as "0xE000 0000" is stored in the destination address field of the header.

The BAP packet is transmitted to the IAB node #1, which belongs to the group of multicast (Step S207). Upon reception of the packet by IAB node #1, the destination address is the address for multicast, and thus the termination processing of the packet is executed in accordance with the path setting packet received in advance, so that the data contained in the packet is wirelessly transmitted to the UE #1, which is subordinate to the IAB node #1 (Step S208).

The destination address of the packet received by the IAB node #1 is the address for multicast, so that this packet is also output from the BAP reception controller 211 to the BAP transmission controller 214 in accordance with the path setting packet received in advance. Then, the transmission destination of the packet is set to the IAB nodes #3 and #4 in accordance with the path setting packet, and the packet is transferred to the IAB nodes #3 and #4 (Steps S209 and S210).

Upon reception of the packet transmitted from the IAB node #1 by the IAB nodes #3 and #4, the destination address is the address for multicast, and thus the termination processing of the packet is executed in accordance with the path setting packet received in advance, so that the data contained in the packet is wirelessly transmitted to the UEs #2 and #3, which are subordinate to the IAB nodes #3 and 4, respectively.

Thus, by setting the destination address of the packet to the address for multicast, each IAB node transfers the packet to the IAB node connected to the lower position thereof in accordance with the path setting packet received in advance and transmits the data contained in the packet to the UE, which is subordinate thereto. Thus, when multicasting the data, the IAB donor only needs to transmit the packet once to the IAB node #1, which is positioned on the packet transfer path, without transmitting the packet individually to each IAB node. Consequently, the number of packets transmitted and received in the IAB network can be reduced, and the occurrence of congestion can be avoided to mitigate a reduction in throughput.

Figure 7:
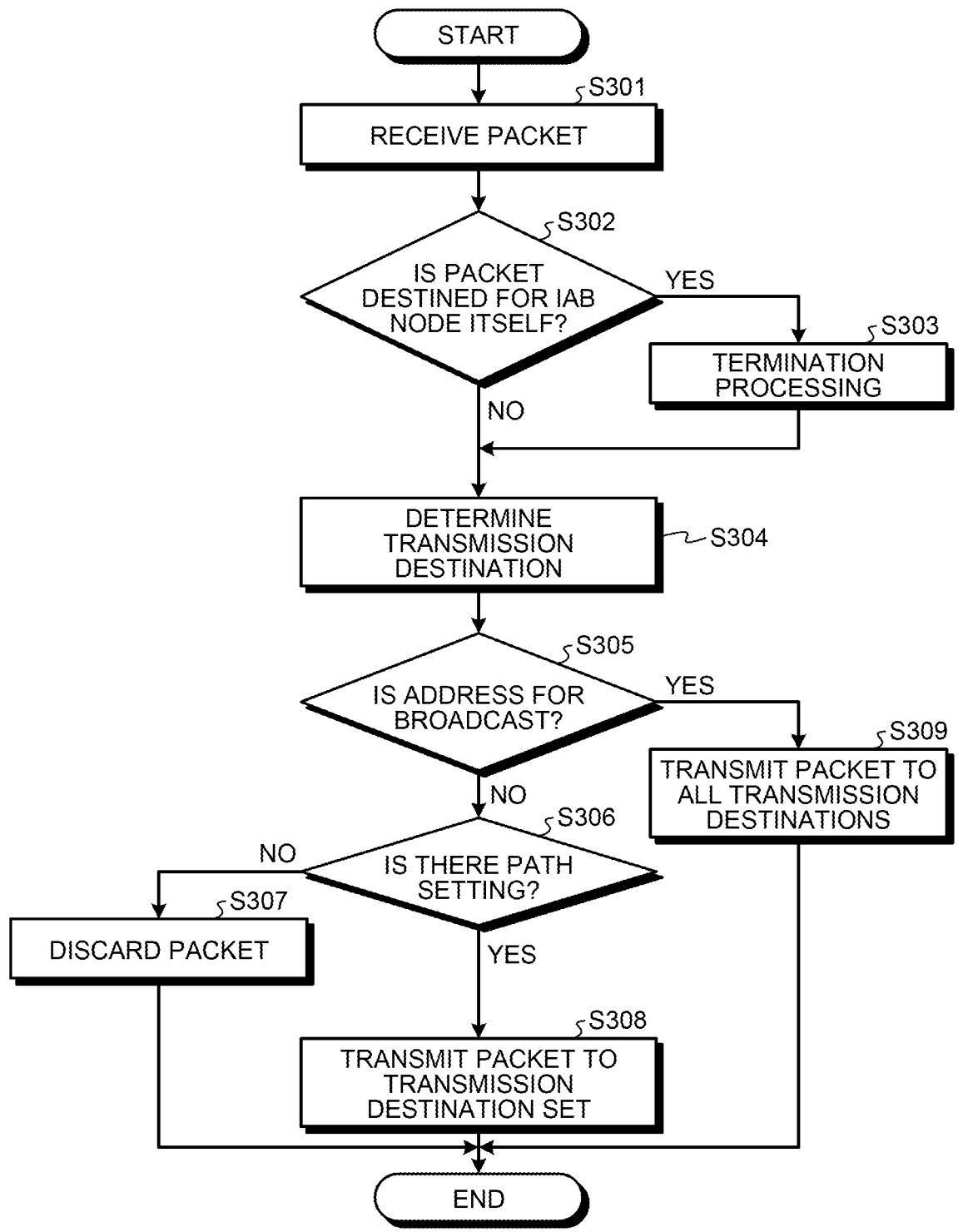
FIG. 7 is a flow diagram of packet processing by the IAB node according to the first embodiment.

The following describes an operation during packet reception by the IAB node 200, which is equivalent to the IAB nodes #1 to #4 with reference to the flow diagram illustrated in FIG. 7. The following describes an operation when a packet transmitted from the IAB donor or another IAB node is received.

Upon reception of the packet by the wireless transmitter-and-receiver 230 via the antenna (Step S301), the packet is output to the BAP reception controller 211. Then, the BAP reception controller 211 determines whether the packet is a packet destined for the IAB node 200 based on the destination address contained in the header of the packet (Step S302). Specifically, the destination address contained in the header of the packet is checked, and if the destination address is the address of the IAB node 200, it is determined that the packet is the packet destined for the IAB node 200. In addition, if the destination address is the address for broadcast also, it is determined that the packet is the packet destined for the IAB node 200. Furthermore, if the destination address is the address for multicast, and if the termination processing of the multicast packet is indicated by the path setting packet received in advance also, it is determined that the packet is the packet destined for the IAB node 200.

After such a determination, if the packet is the packet destined for the IAB node 200 (Yes at Step S302), the BAP termination processing is executed (Step S303). That is to say, the BAP reception controller 211 takes out the reception data contained in the packet, and the reception data is output to the upper protocol processing unit 212. This reception data is processed by the upper protocol processing unit 212 and is then transmitted from the wireless transmitter-and-receiver 230 to the user equipment, which is subordinate thereto. If the destination address of the packet is the address for multicast or the address for broadcast, the packet is output from the BAP reception controller 211 to the BAP transmission controller 214.

On the other hand, if the packet is not the packet destined for the IAB node 200 (No at Step S302), the packet is output from the BAP reception controller 211 to the BAP transmission controller 214. Thus, if the destination address of the packet is the address for multicast, the address for broadcast, or the address of an IAB node other than the IAB node 200, the packet is output to the BAP transmission controller 214. Then, the transmission destination determination unit 213 checks the destination address of the packet and determines the transmission destination of the packet output to the BAP transmission controller 214 (Step S304).

Specifically, the transmission destination determination unit 213 determines whether the destination address is the address for broadcast (Step S305). After this determination, if the destination address is the address for broadcast (Yes at Step S305), it is determined that the transmission destination of the packet output to the BAP transmission controller 214 is all the IAB nodes connected to the lower position of the IAB node 200. Then, the BAP transmission controller 214 executes transmission processing to transfer the packet to all the IAB nodes connected to the lower position thereof, and the packet is transmitted from the wireless transmitter-and-receiver 230 (Step S309).

If the destination address of the packet is not the address for broadcast (No at Step S305), the transmission destination determination unit 213 determines whether the path setting packet with an instruction on the transmission destination corresponding to the destination address has been received in advance (Step S306). After this determination, if the transmission destination corresponding to the destination address has been indicated by the path setting packet (Yes at Step S306), the transmission destination of the packet output to the BAP transmission controller 214 is identified in accordance with the path setting packet. In this example, if the destination address is the address for multicast also, the transmission destination corresponding to the address for multicast is identified in accordance with the path setting packet received in advance. Then, the BAP transmission controller 214 executes transmission processing to transfer the packet to the identified destination, and the packet is transmitted from the wireless transmitter-and-receiver 230 (Step S308).

On the other hand, if the path setting packet with an instruction on the transmission destination corresponding to the destination address has not been received in advance (No at Step S306), the transmission destination of the packet is not identified, and thus the packet output to the BAP transmission controller 214 is discarded (Step S307). This processing prevents a packet with an unknown transmission destination from being uselessly transmitted and can prevent the number of packets transmitted and received in the IAB network from increasing.

As described above, according to the present embodiment, when broadcast or multicast, which transmits the same data to a plurality of IAB nodes, is executed, the IAB donor sets the destination address of the BAP packet to the address for broadcast or the address for multicast and transmits the packet. Then, the IAB node receiving the packet transfers the packet to all the IAB nodes connected to the lower position thereof if the destination address is the address for broadcast and transfers the packet in accordance with the path setting packet received in advance if the destination address is the address for multicast. Thus, the IAB donor can transmit the packet to the IAB nodes without transmitting the packet individually to each IAB node. Consequently, the number of packets transmitted and received in the IAB network can be reduced, the occurrence of congestion can be avoided, and a reduction in throughput can be mitigated.

[b] Second Embodiment

By the way, in the packet broadcasting according to the first embodiment above, each IAB node transfers the packet to all the IAB nodes connected to the lower position thereof, and thus the same packet may be received via a plurality of paths depending on the connection relation of the IAB nodes. Specifically, in the packet broadcasting illustrated in FIG. 5, for example, the IAB node #3 receives the packet more than once from both the IAB nodes #1 and #2. Similarly, the IAB node #4 also receives the packet more than once from both the IAB nodes #1 and #2.

Given these circumstances, the second embodiment describes a method to avoid the same packet from being received more than once by the IAB node when packet broadcasting is performed.

Figure 8:
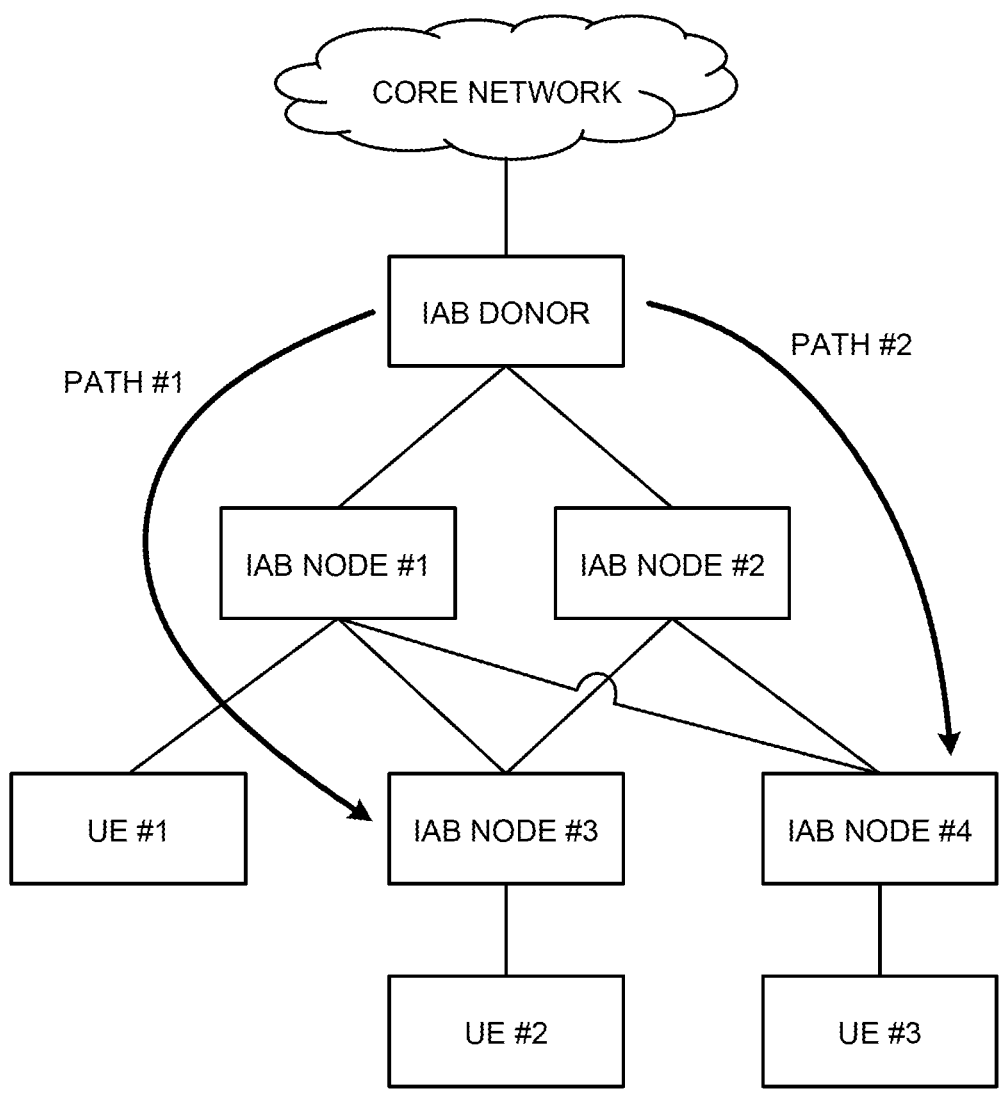
FIG. 8 is a diagram illustrating setting of paths.

FIG. 8 is a diagram of a configuration example of a wireless communication system according to the second embodiment. While the wireless communication system illustrated in FIG. 8 has the same configuration as that of the wireless communication system according to the first embodiment (FIG. 1), in the second embodiment, paths #1 and #2 connecting the IAB donor and the IAB nodes #1 to #4 to each other are set. Specifically, the path #1 connecting the IAB donor, the IAB node #1, and the IAB node #3 to each other and the path #2 connecting the IAB donor, the IAB node #2, and the IAB node #4 to each other are set. The paths #1 and #2 are defined when path search is performed by the IAB donor.

The configurations of the IAB donor and the IAB nodes #1 to #4 according to the second embodiment are equivalent to those of the IAB donor 100 (FIG. 2) and the IAB node 200 (FIG. 4), respectively, according to the first embodiment, and thus descriptions thereof are omitted. In the second embodiment, the BAP transmission controller 122 of the IAB donor 100, when setting the destination address of the packet to the address for broadcast, stores the identification information of either the path #1 or #2 in the path field of the header of the packet and transmits the packet. The BAP transmission controller 122 transmits, to each IAB node, the path setting packet with an instruction on the transmission destination of the packet corresponding to each of the paths #1 and #2, in advance.

Figure 9:
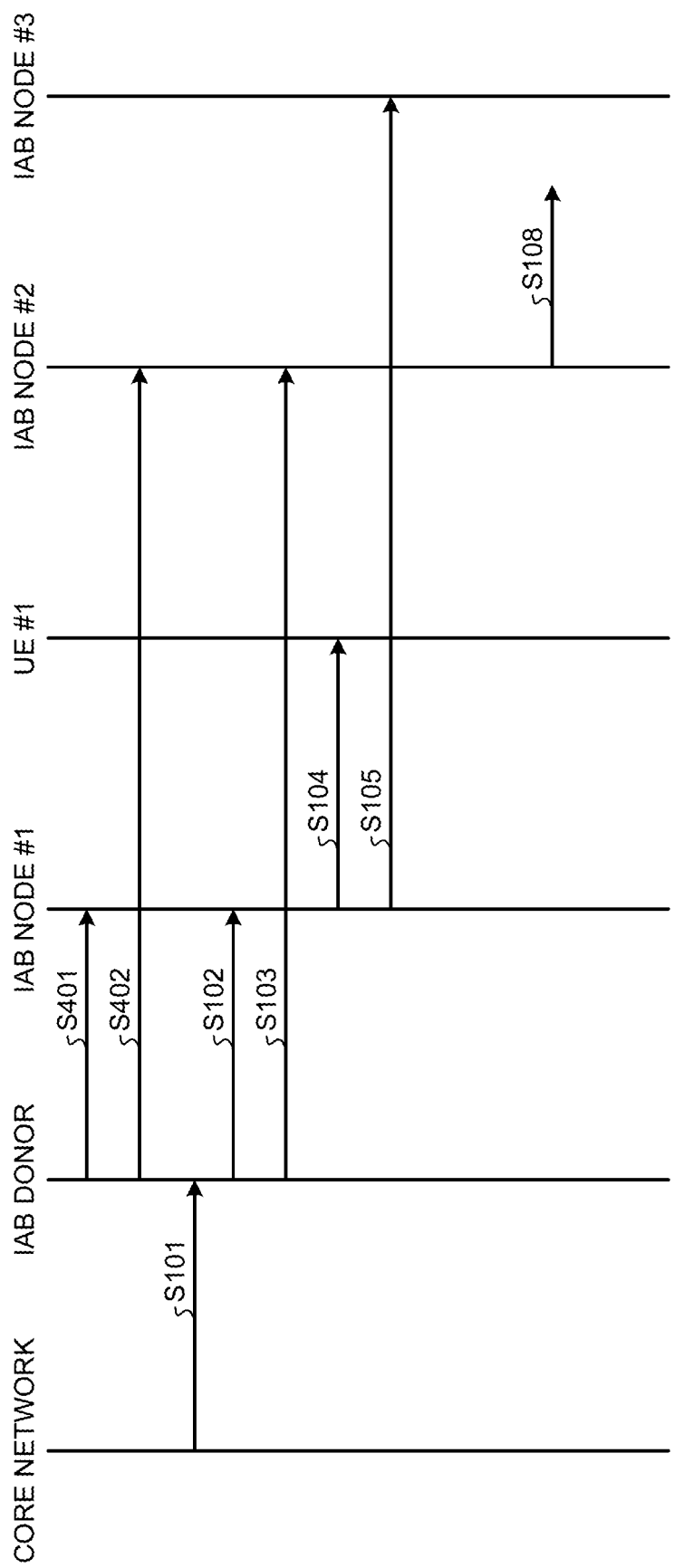
FIG. 9 is a sequence diagram of an example of broadcast according to a second embodiment.

The following describes packet broadcasting in the wireless communication system illustrated in FIG. 8 with reference to the sequence diagram illustrated in FIG. 9. In FIG. 9, the same parts as those in FIG. 5 are denoted by the same symbols, and detailed descriptions thereof are omitted.

When broadcasting data, the IAB donor defines the paths #1 and #2 and transmits, to the IAB nodes #1 and #2, the path setting packet corresponding to the paths #1 and #2.

Specifically, the IAB donor transmits, to the IAB node #1, the path setting packet with an instruction to perform the termination processing of the packet the destination address of which is the address for broadcast and the path of which is set to the path #1 and to transfer the packet to the IAB node #3 (Step S401). The IAB donor transmits, to the IAB node #2, the path setting packet with an instruction to transfer the packet the destination address of which is the address for broadcast and the path of which is set to the path #2 to the IAB node #4 (Step S402).

Thus, the IAB donor transmits, to each IAB node, the pass setting packet with an instruction on the transmission destination of the packet corresponding to the path when the packet with the address for broadcast is received. The path setting packet is transmitted to all the IAB nodes contained in the respective paths.

Upon reception of the data to be broadcast by the IAB donor with the transmission destination thus set for each path (Step S101), the BAP packet is generated. In this process, the destination address of the packet to be transmitted to the IAB node #1 is set to the address for broadcast and the path thereof is set to the path #1. Similarly, the destination address of the packet to be transmitted to the IAB node #2 is set to the address for broadcast and the path thereof is set to the path #2.

The BAP packet is transmitted to the IAB nodes #1 and #2, which are connected to the lower position of the IAB donor (Steps S102 and S103). Upon reception of the packet by the IAB node #1, the destination address is the address for broadcast, so that the BAP reception controller 211 executes the BAP termination processing, and then the data contained in the packet is wirelessly transmitted to the UE #1, which is subordinate to the IAB node #1 (Step S104).

The destination address of the packet received by the IAB node #1 is the address for broadcast, so that this packet is also output from the BAP reception controller 211 to the BAP transmission controller 214. The destination address of the packet is the address for broadcast and the path thereof is set to the path #1, and thus the transmission destination of the packet is identified as the IAB node #3 in accordance with the path setting packet received in advance, and the packet is transferred to the IAB node #3 (Step S105).

Upon reception of the packet transmitted from the IAB node #1 by the IAB node #3, the destination address is the address for broadcast, and thus the BAP termination processing is executed, so that the data contained in the packet is wirelessly transmitted to the UE #2, which is subordinate to the IAB node #3.

On the other hand, upon reception of the packet transmitted from the IAB donor by the IAB node #2, the destination address is the address for broadcast, so that this packet is output from the BAP reception controller 211 to the BAP transmission controller 214. The destination address of the packet is the address for broadcast and the path thereof is set to the path #2, and thus the transmission destination of the packet is identified as the IAB node #4 in accordance with the path setting packet received in advance, and the packet is transferred to the IAB node #4 (Step S108). Although illustration of the IAB node #4 is omitted in FIG. 9, Step S108 indicates transfer of the packet from the IAB node #2 to the IAB node #4.

Upon reception of the packet transmitted from the IAB node #2 by the IAB node #4, the destination address is the address for broadcast, and thus the BAP termination processing is executed, so that the data contained in the packet is wirelessly transmitted to the UE #3, which is subordinate to the IAB node #4.

Thus, by performing path setting for each path, even when the packet is broadcast, the packet is not received by the IAB node more than once. That is to say, the IAB node #3, for example, receives the packet transmitted from the IAB node #1 but does not receive the packet transmitted from the IAB node #2. Similarly, the IAB node #4 does not receive the packet transmitted from the IAB node #1 but receives the packet transmitted from the IAB node #2. Consequently, the same packet is not transmitted and received more than once, the number of packets transmitted and received in the IAB network can be reduced, and the occurrence of congestion can be avoided to mitigate a reduction in throughput.

As described above, according to the present embodiment, when broadcast, which transmits the same data to all the IAB nodes, is executed, the IAB donor defines paths that do not pass through each IAB node more than once and transmits, to each IAB node, the path setting packet with an instruction on the transmission destination of the packet according to the path. Then, the IAB donor sets the destination address of the BAP packet to the address for broadcast, stores the identification information of the path in the header of the packet, and transmits the packet. The IAB node receiving the packet, if the destination address is the address for broadcast, transfers the packet to the IAB node as the transmission destination according to the path in accordance with the path setting packet received in advance. Thus, the packet is not received more than once by the IAB node, the number of packets transmitted and received in the IAB network can be reduced, the occurrence of congestion can be avoided, and a reduction in throughput can be mitigated.

[c] Another Embodiment

In the packet multicasting according to the first embodiment above, it is assumed that the path setting packet is transmitted individually to each IAB node belonging to the group. However, it is also possible to reduce the number of path setting packets transmitted and received in the IAB network by broadcasting the path setting packet. Specifically, the IAB donor may generate the path setting packet containing path setting information about all the IAB nodes belonging to the group of multicast, set the destination address of this path setting packet to the address for broadcast, and transmit the path setting packet.

Figure 10:
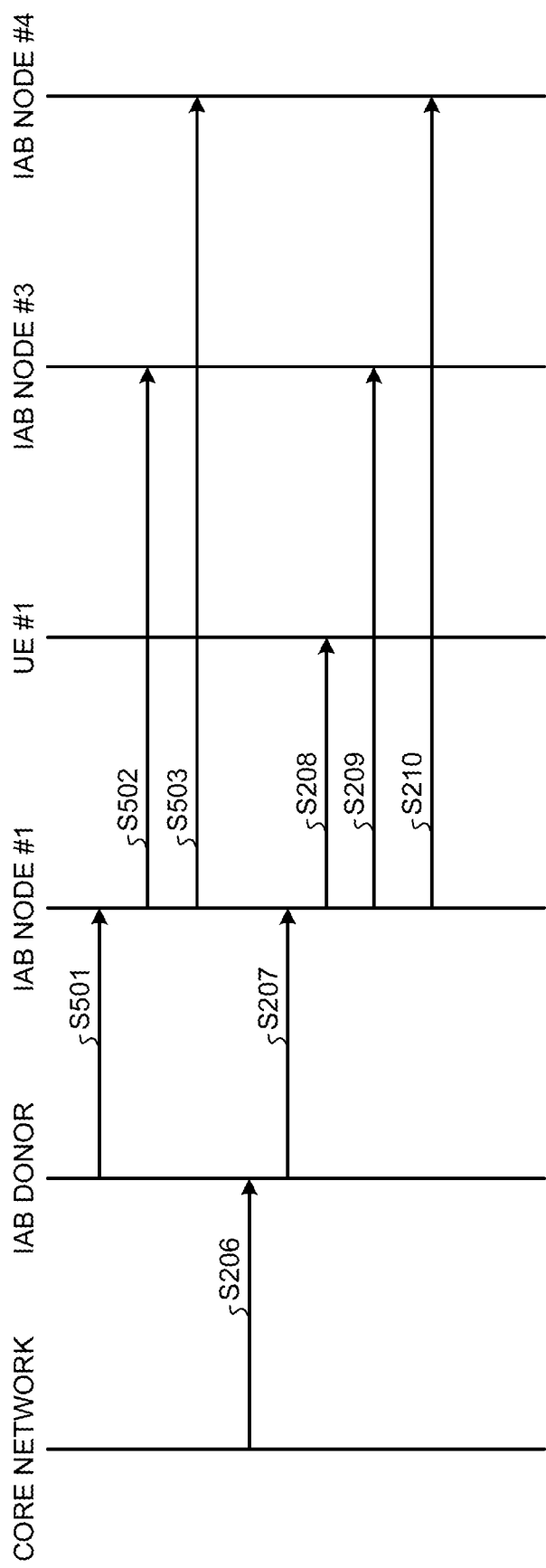
FIG. 10 is a sequence diagram of an example of multicast according to another embodiment.

FIG. 10 is a sequence diagram of multicast using the path setting packet containing the path setting information about a plurality of IAB nodes. In FIG. 10, the same parts as those in FIG. 6 are denoted by the same symbols, and descriptions thereof are omitted.

When data is multicast, a group of IAB nodes is set, and the IAB nodes belonging to the group receive the packet. The following gives a description with the IAB nodes #1, #3, and #4, except for the IAB node #2, assumed to belong to the group. The IAB donor determines the transfer path of the packet to the IAB nodes #1, #3, and #4 belonging to the group and, for the packet the destination address of which is the address for multicast, generates the path setting packet designating the transmission destination from each of the IAB nodes #1, #3, and #4. That is to say, the IAB donor generates the path setting packet containing the path setting information of the IAB nodes. Then, the IAB donor sets the destination address of the generated path setting packet to the address for broadcast and transmits the path setting packet to the IAB node #1 (Step S501).

Upon reception of the path setting packet by the IAB node #1, the IAB node #1 stores therein a setting about the node contained in the path setting packet. That is to say, when receiving the packet the destination address of which is the address for multicast, the IAB node #1 stores therein performing the termination processing of this packet, transmitting the data to the UE #1, which is subordinate thereto, and transferring the packet to the IAB nodes #3 and #4. Then, the destination address of the path setting packet is the address for broadcast, so that the IAB node #1 transfers the path setting packet to the IAB nodes #3 and #4, which are connected to the lower position thereof (Steps S502 and S503).

Upon reception of the path setting packet by the IAB nodes #3 and #4, the IAB nodes #3 and #4 each store therein a setting about the node contained in the path setting packet. That is to say, when receiving the packet the destination address of which is the address for multicast, the IAB node #3 stores therein performing the termination processing of this packet and transmitting the data to the UE #2, which is subordinate thereto. Similarly, when receiving the packet the destination address of which is the address for multicast, the IAB node #4 stores therein performing the termination processing of this packet and transmitting the data to the UE #3, which is subordinate thereto.

Thus, the path setting information about all the IAB nodes positioned on the transfer path of the packet to be multicast is contained in the path setting packet, and this path setting packet is broadcast. This processing enables the IAB node receiving the path setting packet to store therein the path setting information about the node and to prepare for receiving the packet the destination address of which is the address for multicast.

After the path setting packet is broadcast, in the same manner as in the packet multicasting according to the first embodiment above, the packet with the address for multicast set to the destination address is multicast from the IAB donor to the IAB nodes #1, #3, and #4.

As described above, by broadcasting the path setting packet containing the path setting information about the IAB nodes, the number of path setting packets transmitted and received when the packet is multicast can be reduced, and the occurrence of congestion can be avoided more surely.

The above embodiments can be performed in combination with each other as appropriate. When broadcasting the path setting packet containing the path setting information about the IAB nodes, the path setting packet may be broadcast with the path set as in the second embodiment above, for example.

An aspect of the wireless communication device and the wireless communication system disclosed by the present application produces an effect of making it possible to avoid the occurrence of congestion and to mitigate a reduction in throughput.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A wireless communication device comprising:
   a processor that generates a first packet; and
   a transmitter that wirelessly transmits the first packet generated by the processor, wherein
   the processor is configured to:
      generate the first packet containing data destined for a plurality of nodes including a first device;
      set a destination address different from respective addresses of the plurality of nodes in the first packet, the destination address specifying that the first packet is destined for the plurality of nodes; and
      make the first device to determine a transmission destination of the first packet in accordance with the destination address by setting the destination address in the first packet, and to perform a process for a transmission of a second packet different from the first packet in accordance with the first packet.

2. The wireless communication device according to claim 1, wherein the processor is configured to:
   set a first destination address in the first packet when the first packet is broadcast, or set a second destination address different from the first destination address in the first packet when the first packet is multicast; and
   make, by setting the first destination address, the first device to determine all nodes connected to a lower position of the first device to be the transmission destination of the first packet.

3. The wireless communication device according to claim 1, wherein the processor is configured to set in the first packet identification information of a path corresponding to a transfer path of the first packet, the identification information being information for informing the first device about the transmission destination of the first packet.

4. The wireless communication device according to claim 1, wherein the processor is configured to:
   generate a path setting packet with an instruction on a transmission destination of the first packet to a node positioned on a transfer path of the first packet; and
   transmit the path setting packet to the node positioned on the transfer path of the first packet before transmitting the first packet.

5. The wireless communication device according to claim 1, wherein
   the first packet is a packet of Backhaul Adaptation Protocol (BAP), and
   the setting of the destination address including storing the destination address in a destination address field contained in a header of the first packet.

6. A wireless communication device comprising:
   a receiver that receives a first packet;
   a processor that determines a transmission destination of the first packet received by the receiver; and
   a transmitter that transmits the first packet to the transmission destination determined by the processor, wherein
   the processor is configured to:
      determine, when a destination address of the received first packet is an address different from an address of the wireless communication device, the destination address specifying that the first packet is destined for a plurality of nodes including the wireless communication device, the transmission destination of the first packet in accordance with the destination address; and
      perform a process for a transmission of a second packet different from the first packet in accordance with the first packet.

7. The wireless communication device according to claim 6, wherein the processor is configured to determine all nodes connected to a lower position of the wireless communication device to be the transmission destination when the destination address of the first packet is a first destination address specifying that the first packet is to be broadcast.

8. The wireless communication device according to claim 6, wherein the processor is configured to determine in accordance with a path setting packet received in advance of receiving the first packet to be the transmission destination when the destination address of the first packet is a second destination address specifying that the first packet is to be multicast.

9. A wireless communication system comprising:
   a first wireless communication device; and
   a second wireless communication device, wherein
   the first wireless communication device includes:
      a first processor that generates a first packet; and
      a first transmitter that wirelessly transmits the first packet generated by the first processor,
   the first processor is configured to:
      generate the first packet containing data destined for a plurality of nodes including a first device and
      set a destination address different from respective addresses of the plurality of nodes in the first packet, the destination address specifying that the first packet is destined for the plurality of nodes,
   the second wireless communication device includes:
      a receiver that receives the first packet transmitted from the first wireless communication device;
      a second processor that determines a transmission destination of the first packet received by the receiver; and
      a second transmitter that transmits the first packet to the transmission destination determined by the second processor, and
   the second processor is configured to:
   determine, when a destination address of the first packet specifies that the destination address is destined for the plurality of nodes including the second wireless communication device, a transmission destination of the first packet in accordance with the destination address; and perform a process for a transmission of a second packet different from the first packet in accordance with the first packet.

10. The wireless communication device according to claim 6, wherein the processor is configured to determine the transmission destination of the first packet in accordance with the identification information contained in the first packet, the identification information being identification information for identifying a path corresponding to a transfer path of the first packet.

* * * * *